US008600792B2

(12) United States Patent
Drittler et al.

(10) Patent No.: US 8,600,792 B2
(45) Date of Patent: Dec. 3, 2013

(54) BUSINESS PROCESS VISIBILITY AT REAL TIME

(75) Inventors: Bernhard Drittler, Walldorf (DE); Ralf Ehret, Walldorf (DE); Jens-Christoph Nolte, Sandhausen (DE); Bernd Schmitt, Waldbronn (DE)

(73) Assignee: SAP AG, Walldorf (DE)

( * ) Notice: Subject to any disclaimer, the term of this patent is extended or adjusted under 35 U.S.C. 154(b) by 223 days.

(21) Appl. No.: 12/977,064

(22) Filed: Dec. 23, 2010

(65) Prior Publication Data

US 2012/0166234 A1 Jun. 28, 2012

(51) Int. Cl.
*G06Q 10/00* (2012.01)
(52) U.S. Cl.
USPC ............................................. 705/7.11
(58) Field of Classification Search
USPC ......................................... 705/7.11
See application file for complete search history.

(56) References Cited

U.S. PATENT DOCUMENTS

| | | | | |
|---|---|---|---|---|
| 5,303,375 A * | 4/1994 | Collins et al. | ................ | 718/100 |
| 5,517,655 A * | 5/1996 | Collins et al. | ................ | 715/736 |
| 5,826,239 A * | 10/1998 | Du et al. | ................ | 705/7.26 |
| 6,985,938 B2 * | 1/2006 | Ohsaki et al. | ................ | 709/223 |
| 7,313,575 B2 * | 12/2007 | Carr et al. | ................ | 1/1 |
| 7,370,335 B1 * | 5/2008 | White et al. | ................ | 719/328 |
| 7,454,466 B2 * | 11/2008 | Bellotti et al. | ................ | 709/206 |
| 8,171,492 B2 * | 5/2012 | McGuire et al. | ................ | 719/310 |
| 8,307,373 B2 * | 11/2012 | Day | ................ | 719/318 |
| 2004/0068424 A1 * | 4/2004 | Lee et al. | ................ | 705/7 |
| 2006/0095555 A1 * | 5/2006 | Ohsaki et al. | ................ | 709/223 |
| 2006/0184410 A1 * | 8/2006 | Ramamurthy et al. | ................ | 705/8 |
| 2007/0124185 A1 * | 5/2007 | Elkin et al. | ................ | 705/8 |
| 2007/0129982 A1 * | 6/2007 | Schaad | ................ | 705/8 |
| 2007/0185746 A1 * | 8/2007 | Chieu et al. | ................ | 705/7 |
| 2008/0065453 A1 * | 3/2008 | Settuducati | ................ | 705/8 |
| 2008/0183528 A1 * | 7/2008 | Chieu et al. | ................ | 705/7 |
| 2008/0209416 A1 * | 8/2008 | De Souza et al. | ................ | 718/100 |
| 2008/0215389 A1 * | 9/2008 | Heidasch | ................ | 705/7 |
| 2009/0037240 A1 * | 2/2009 | Schmidt et al. | ................ | 705/7 |
| 2009/0070783 A1 * | 3/2009 | Schmidt et al. | ................ | 719/318 |
| 2009/0164985 A1 * | 6/2009 | Balko et al. | ................ | 717/162 |
| 2009/0171720 A1 * | 7/2009 | Crook et al. | ................ | 705/7 |
| 2009/0327199 A1 * | 12/2009 | Weber et al. | ................ | 706/48 |

(Continued)

OTHER PUBLICATIONS

SAP Business Activity Monitoring—Setting up a Milestone Monitoring Process, downloaded Sep. 10, 2012 from 2008http://www.sdn.sap.com/irj/scn/go/portal/prtroot/docs/library/uuid/70a25d3a-e4fa-2a10-43b5-b4169ba3eb17?QuickLink=index&overridelayout=true&30953829312305.*

(Continued)

*Primary Examiner* — Peter Choi
*Assistant Examiner* — George H Walker (57) ABSTRACT

Various embodiments of systems and methods for providing business process visibility at real time are described herein. One or more business activity events are received at a local business activity event manager. Further, business process binding information associated with the one or more business activity events is retrieved at the business activity manager from a business process model manager. A relationship of the one or more business activity events with a business process using the business process binding is identified at the business activity event manager. Upon determination, a business process log manager is triggered for logging a business activity log of a business process instance at real time. Furthermore, the business activity log is extracted to monitor and analyze the business process instance at real time.

17 Claims, 7 Drawing Sheets

| TIME STAMP 505 | BA TYPE 510 | BA ID 515 | BO TYPE 520 | BO ID 525 | CALLABLE BUSINESS ENTITY 530 | PREDECESSOR BO TYPE 535 | PREDECESSOR BO ID 540 | PREDECESSOR BA TYPE 545 | PREDECESSOR BA ID 550 | BUSINESS PROCESS 555 | BUSINESS PROCESS STEP 560 | START PROCESS INSTANCE 565 | BUSINESS PROCESS INSTANCE ID 570 |
|---|---|---|---|---|---|---|---|---|---|---|---|---|---|
| T1 | CREATE SO | 1 | SO | 4711 | VN01 | - | - | - | - | SO2D | CREATE SALES ORDER | X | 1 |
| T2 | CREATE SO | 2 | SO | 4712 | VN01 | - | - | - | - | SO2D | CREATE SALES ORDER | X | 2 |
| T3 | RELEASE SO | 3 | SO | 4711 | VA04 | - | - | CREATE SO | 1 | SO2D | RELEASE SALES ORDER | | 1 |
| T4 | RELEASE SO | 4 | SO | 4712 | VA04 | - | - | CREATE SO | 2 | SO2D | RELEASE SALES ORDER | | 2 |
| T5 | CREATE OD | 5 | OD | 3030 | VN01 | SO | 4711 | RELEASE SO | 3 | SO2D | CREATE DELIVERY | | 1 |
| | | | | | | | 4712 | RELEASE SO | 4 | SO2D | | | 2 |
| T6 | CREATE SO | 6 | SO | 4713 | VN01 | - | - | - | - | SO2D | CREATE SALES ORDER | X | 3 |
| T7 | CREATE OD | 7 | OD | 3031 | VN01 | SO | 4711 | RELEASE SO | 3 | SO2D | CREATE DELIVERY | | 1 |
| T8 | RELEASE SO | 8 | SO | 4713 | VA04 | - | - | CREATE SO | 6 | SO2D | RELEASE SALES ORDER | | 1 |
| T9 | CHANGE OD | 9 | OD | 3030 | VNOX | SO | 4713 | RELEASE SO | 8 | SO2D | CHANGE DELIVERY | | 3 |
| | | | | | | | | CREATE OD | 5 | SO2D | | | 1, 2 |
| T10 | RELEASE OD | 10 | OD | 3030 | VN04 | - | - | CHANGE OD | 9 | SO2D | RELEASE DELIVERY | | 1, 2, 3 |
| T11 | RELEASE OD | 11 | OD | 3031 | VN04 | - | - | CREATE OD | 7 | SO2D | RELEASE DELIVERY | | 1 |

500

(56) References Cited

U.S. PATENT DOCUMENTS

2010/0223557 A1* 9/2010 Kenney et al. .............. 715/736
2011/0004627 A1* 1/2011 Reca et al. .................. 707/778
2011/0071869 A1* 3/2011 O'Brien et al. ................ 705/7

OTHER PUBLICATIONS

Business Activity Monitoring—Overview, 2008. downloaded Sep. 10, 2012 from http://www.sdn.sap.com/irj/scn/go/portal/prtroot/docs/library/uuid/a0334534-aa28-2b10-a3a2-9ed4135727ed?overridelayout=true.*

Samanvitha Kumar and Swetha Rao. "Monitoring your SAP system using WebSphere SAP Adapter and WebSphere Business Monitor." IBM, 2009. downloaded Sep. 10, 2012 from http://www.ibm.com/developerworks/websphere/tutorials/0907_kumar/section4.html.*

IDS Scheer and Systar. "Process Event Monitoring." 2005 downloaded Sep. 10, 2012 from http://www.citt-online.com/downloads/exp5/IDS%20Scheer%20+%20Systar,%20Regensburg.pdf.*

* cited by examiner

| TIME STAMP 505 | BA TYPE 510 | BA ID 515 | BO TYPE 520 | BO ID 525 | CALLABLE BUSINESS ENTITY 530 | PREDECESSOR BO TYPE 535 | PREDECESSOR BO ID 540 | PREDECESSOR BA TYPE 545 | PREDECESSOR BA ID 550 | BUSINESS PROCESS 555 | BUSINESS PROCESS STEP 560 | START PROCESS INSTANCE 565 | BUSINESS PROCESS INSTANCE ID 570 |
|---|---|---|---|---|---|---|---|---|---|---|---|---|---|
| T1 | CREATE SO | 1 | SO | 4711 | VN01 | - | - | - | - | SO2D | CREATE SALES ORDER | X | 1 |
| T2 | CREATE SO | 2 | SO | 4712 | VN01 | - | - | - | - | SO2D | CREATE SALES ORDER | X | 2 |
| T3 | RELEASE SO | 3 | SO | 4711 | VA04 | - | - | CREATE SO | 1 | SO2D | RELEASE SALES ORDER | | 1 |
| T4 | RELEASE SO | 4 | SO | 4712 | VA04 | - | - | CREATE SO | 2 | SO2D | RELEASE SALES ORDER | | 2 |
| T5 | CREATE OD | 5 | OD | 3030 | VN01 | SO | 4711 | RELEASE SO | 3 | SO2D | CREATE DELIVERY | | 1 |
| | | | | | | | 4712 | RELEASE SO | 4 | | | | 2 |
| T6 | CREATE SO | 6 | SO | 4713 | VN01 | - | - | - | - | SO2D | CREATE SALES ORDER | X | 3 |
| T7 | CREATE OD | 7 | OD | 3031 | VA04 | SO | 4711 | RELEASE SO | 3 | SO2D | CREATE DELIVERY | | 1 |
| T8 | RELEASE SO | 8 | SO | 4713 | VNOX | SO | 4713 | CREATE SO | 6 | SO2D | RELEASE SALES ORDER | | 3 |
| T9 | CHANGE OD | 9 | OD | 3030 | VN04 | | | CREATE OD | 5 | SO2D | CHANGE DELIVERY | | 3 |
| | | | | | | | | | | | | | 1, 2 |
| T10 | RELEASE OD | 10 | OD | 3030 | VN04 | | | CHANGE OD | 9 | SO2D | RELEASE DELIVERY | | 1, 2, 3 |
| T11 | RELEASE OD | 11 | OD | 3031 | VN04 | | | CREATE OD | 7 | SO2D | RELEASE DELIVERY | | 1 |

BUSINESS PROCESS VISIBILITY AT REAL TIME

FIELD

Embodiments generally relate to computer systems and more particularly to methods and systems for providing business process visibility at real time.

BACKGROUND

Today, business process management plays an important role in a competitive business arena. Typically, a business process is an aggregate of business activities that evolves through various stages or instances. Most business applications are executed without the use of an explicit workflow or process engine. These business processes, the so called built-in processes, may not require any explicit process definition for execution. The process logic is reflected in the implemented business logic. In other words, for built-in processes, the process visibility on process instance level is not given today.

In general, gaining end-to-end business process visibility at real time in today's distributed, interconnected business applications is difficult. As a result, it is hard to get a picture of what is happening, or not happening, in the run-time environment. Currently, a report can be generated using databases and other associated modules after the business process is completed. However, the report cannot be generated synchronously when the business process is running or at run-time. Therefore, a real time visibility of the status of the business processes instances is desirable since real time monitoring is a prerequisite for continued business process improvement or to act as soon as an issue becomes visible at the horizon.

SUMMARY

Various embodiments of systems and methods for providing business process visibility at real time are described herein. One or more business activity events are received at a business activity event manager. Further, business process binding information associated with the one or more business activity events is retrieved at the business activity event manager from a business process model manager. A relationship of the one or more business activity events with a business process definition is determined using the business process binding information at the business activity event manager. Upon determination, a business process log manager is triggered for logging a business activity log of a business process instance. Furthermore, the business activity log is extracted to monitor and analyze the business process instance at real time.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for providing business process visibility at real time are described herein. Business process consists of a list of sequential and parallel business process steps, which manage changing of information from one or more sources to one or more destinations. Such sources and destinations may be internal, customer, or partner applications. The business process steps serve to separate the overall business process into parts. Each business process step is self-contained and serves a well defined business purpose. Further, each business process step is bound to a business activity, which is known as a business activity event. The business activity event is executed on top of one or more business objects. In one embodiment, a relationship between each business activity event with the business process is determined at run-time to provide business process visibility. Therefore, visibility of every occurrence of the business process at real time, i.e., visibility of each business activity event that is part of the business process, can be achieved.

According to an embodiment, at run-time, a business activity event manager receives the business activity event from an application. Further, business process binding information associated with the business activity event is retrieved. The business process binding information is the assignment of business activities with a business process definition via the business process step and the optional business activity binding to associate rules with the business activities. A relationship between the business activity event and the business process definition is determined by the business activity event manager using the business process binding information. Furthermore, a business process log manager is triggered for logging a business activity log corresponding to a business process instance based on the determination, which is used to monitor and analyze the business process instance at real time or if required. In other words, the business process log manager correlates the different business activities that have taken place to business process instances. Therefore, a standardized real time business process observation, which correlates business activity events to the business process, is achieved. Further, storing such information in the form of the business activity log allows monitoring and analyzing the business processes, which is the basis for business process optimization and insight to actions.

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
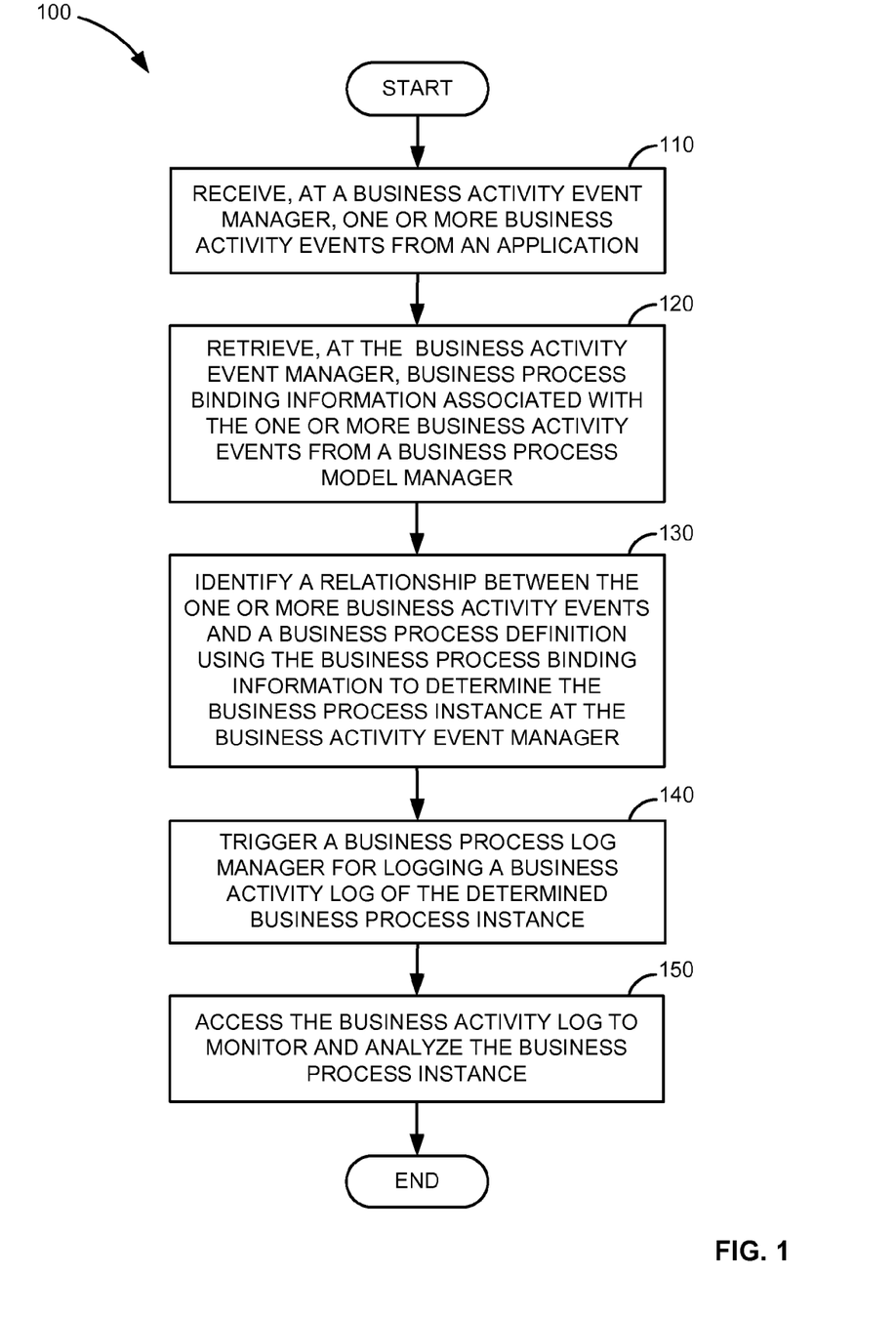
FIG. 1 is a flow diagram illustrating a method of providing business process visibility at real time, according to an embodiment.

FIG. 1 is a flow diagram 100 illustrating a method of providing business process visibility at real time, according to an embodiment. At step 110, one or more business activity events are received at a business activity event manager from an application. The application includes a group of business activities, both sequential and parallel business activity events, of a business process. For example, considering an order-to-delivery business application, business process steps include 'creating sales order', 'changing sales order', and 'creating delivery'. The business process step 'creating sales order' is bound to a business activity 'create sales order'. In one exemplary embodiment, when the business activity 'create sales order' is executed, an associated business activity event 'sales order created' is received by the business activity event manager, immediately after execution.

In one embodiment, the one or more business activity events includes a header including at least one of a business activity type, a business activity ID, a business object type and ID, a business activity event time stamp, a predecessor business object, and a predecessor business object type and ID. The business activity type defines the type of the business activity; 'create sales order' is the business activity type, and the business activity ID is an associated ID of the executed business activity. The business object type and ID define the type (e.g., 'sales order') and the ID of the business object on which the associated business activity event is executed. The business activity event time stamp is the time at which the business activity has been executed and the corresponding business activity event is published. In the context of business processes predecessor, business objects may exist. This information is relevant for the later correlation of the business activities as business process instances. Further, a predecessor business object type and a predecessor business object ID defines a predecessor business object type and a predecessor business object ID associated with the business activity event.

At step 120, business process binding information associated with the one or more business activity events is retrieved at the business activity event manager from a business process model manager. In one embodiment, the business process binding information includes at least one of a business process definition and a business process start indicator associated with the one or more business activity events.

At step 130, a relationship between the one or more business activity events and a business process definition is identified at the business activity event manager using the business process binding information to determine a business process instance. In one embodiment, the relationship between the business activity events and the business process definition is identified by determining number of business process steps associated with the one or more business activity events, so that corresponding business process definition can be assigned to the business activity event. In one exemplary embodiment, more than one process definition can be assigned to the business activity event, if the business activity is linked to multiple process definitions or shared between different process instances (e.g., a delivery may cover the goods shipment for several sales orders). Further, if a predecessor business object type and ID of the one or more business activity events is specified, the one or more business activity events are correlated with the predecessor business object type and ID and an associated business process definition ID. And, if the predecessor business object type and ID of the one or more business activity events is not specified, the one or more business activity events are correlated with the business object type and ID and a business process definition ID of the one or more business activity events.

Further in identifying, if a business activity ID and a business process start indicator of the one or more business activity events are specified, a new business process instance ID associated with the business activity ID of the one or more business activity events is created. And, if the business activity ID and the business process start indicator of the one or more business activity events are not set, an existing business process instance ID is determined, and the business activity ID of the one or more business activity events is correlated with the existing business process instance ID. In other words, whenever the business process start indicator is associated with the business activity via the related business process step, the business activity is considered as a new business process instance and does not include the predecessor business object ID. Further, in all other cases, the business process instance already exists and the appropriate predecessor business activity has to be determined. The predecessor business activity is the last activity on the same business object ID or predecessor business object ID, which is already logged for a business process instance of the business process definition. The process of determination is described in greater detail in FIG. 4.

In one embodiment, the business activity event manager filters relevant predetermined business activity events from the received one or more business activity events for determining the relationship between the one or more business activity events and the business process. In other words, even if a particular business process is active in a system, a user may not be interested in monitoring the particular business process. Then, the business activity event manager may not process the particular business process. Therefore, an option is provided to monitor only those business processes which are of interest for the user.

Figure 5:
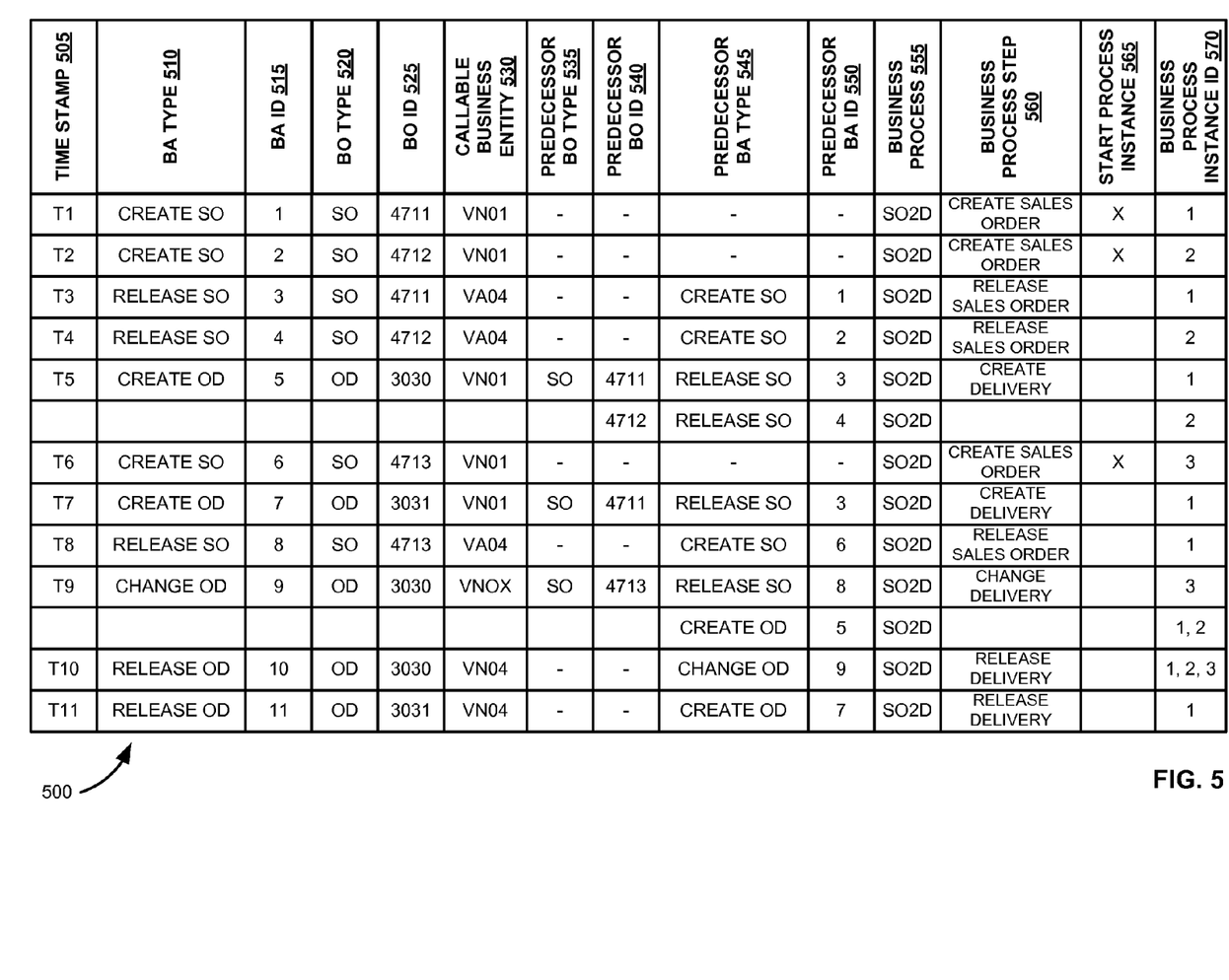
FIG. 5 is a block diagram showing an exemplary business activity log for an exemplary execution of the order-to-delivery business process of FIG. 3, according to an embodiment.

At step 140, a business process log manager is triggered by the business activity event manager for logging a business activity log of a business process instance based on the determination. In one exemplary embodiment, the business process instance is a specific item moving through the business process steps. At step 150, the business activity log is accessed to monitor and analyze the business process instance at real time and/or if required. In general, whenever a business activity (e.g., creation of a 'sales order') takes place, an event informs the execution of the business activity and the event is called business activity event. Further, a business process model defines the scope of the business process visibility, including all business activities which are assumed to be potentially relevant for the business process. Business activity binding allows determining the business process instance via an associated rule definition at runtime to exclude specific business activities and to differentiate for different business process definitions. The method of providing business process visibility is described with an example in FIGS. 2 and 3. And, an exemplary business activity log is shown in FIG. 5.

Figure 2:
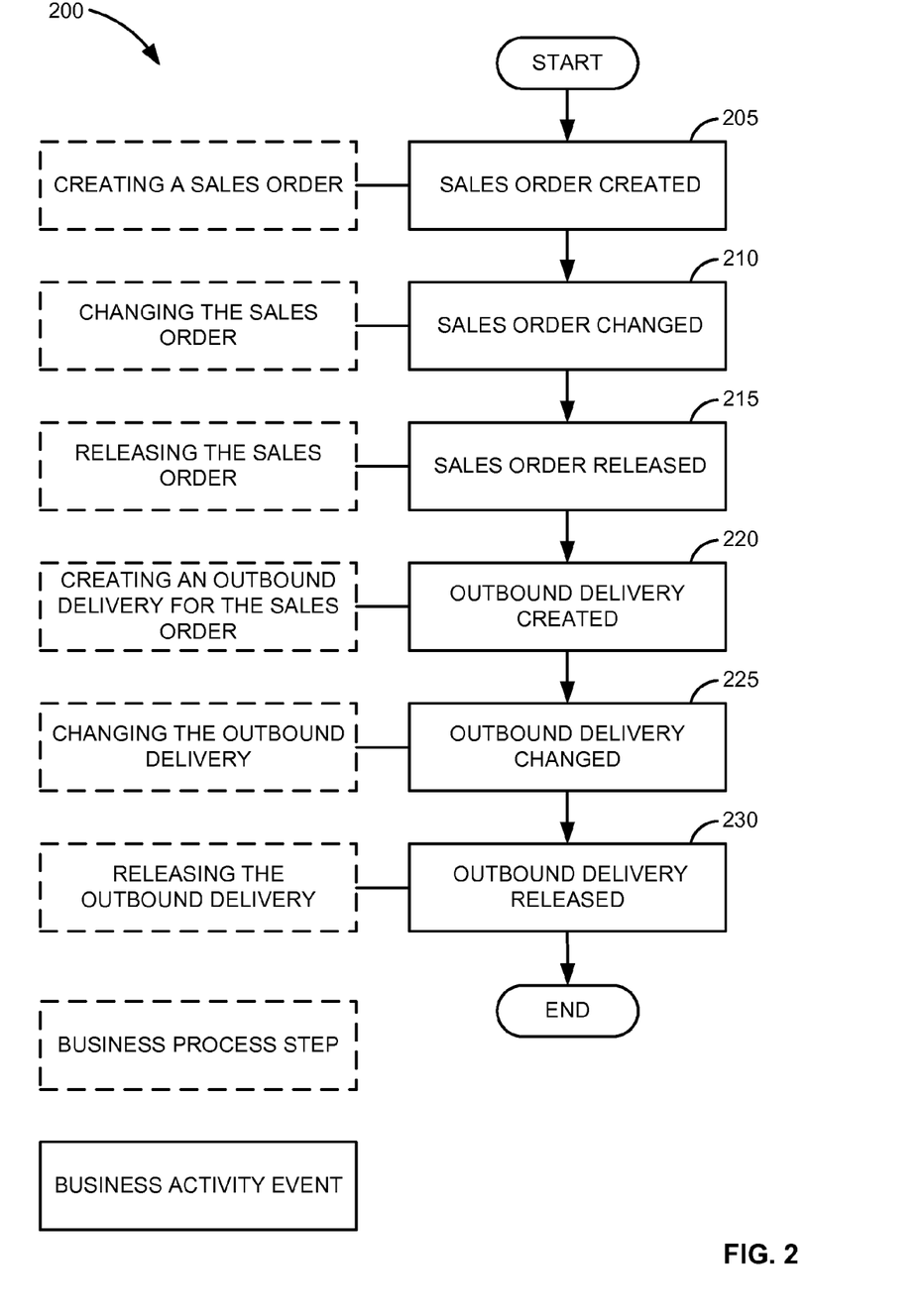
FIG. 2 is a flow diagram illustrating an exemplary order-to-delivery business process, according to an embodiment.

FIG. 2 is a flow diagram 200 illustrating an exemplary order-to-delivery business process, according to an embodiment. The order-to-delivery is a simple built-in business process including various business process steps from creation of a sales order to the release of corresponding outbound deliveries. The business process steps include 'creating a sales order', 'changing the sales order', 'releasing the sales order', 'creating an outbound delivery', 'changing the outbound delivery' and 'releasing the outbound delivery'. In one exemplary embodiment, each process step corresponds to one business activity event and the business activity events are received at a business activity event manager. For example, the business process steps 'creating a sales order', 'changing the sales order', 'releasing the sales order', 'creating an outbound delivery', 'changing the outbound delivery' and 'releasing the outbound deliver' correspond to 'sales order created' 205, 'sales order changed' 210, 'sales order released' 215, 'outbound delivery created' 220, 'outbound delivery changed' 225, and 'outbound delivery released' 230, respectively.

In one exemplary embodiment, each business activity event is associated with at least one of a business object to operate on and information of a predecessor business object, if such predecessor business object exists. Table 1 illustrates business activities and associated corresponding business objects and predecessor business objects of the order-to-delivery business process.

TABLE 1

| Business Activity Event | Business Object | Predecessor Business Object |
| --- | --- | --- |
| Sales order created 205 | Sales order | — |
| Sales order changed 210 | Sales order | — |
| Sales order releases 215 | Sales order | — |
| Outbound delivery created 220 | Outbound delivery | Sales order |
| Outbound delivery changed 225 | Outbound delivery | Sales order |
| Outbound delivery released 230 | Outbound delivery | — |

For example, the business activity event 'sales order created' 205 is associated with the business object 'sales order'. And, 'sales order created' 205 is not associated with any predecessor business object. The business activity event 'outbound delivery created' 220 is associated with the business object 'outbound delivery' and a predecessor business object 'sales order' as depicted in Table 1. The execution of an exemplary business process is described in greater detail in FIG. 3.

Figure 3:
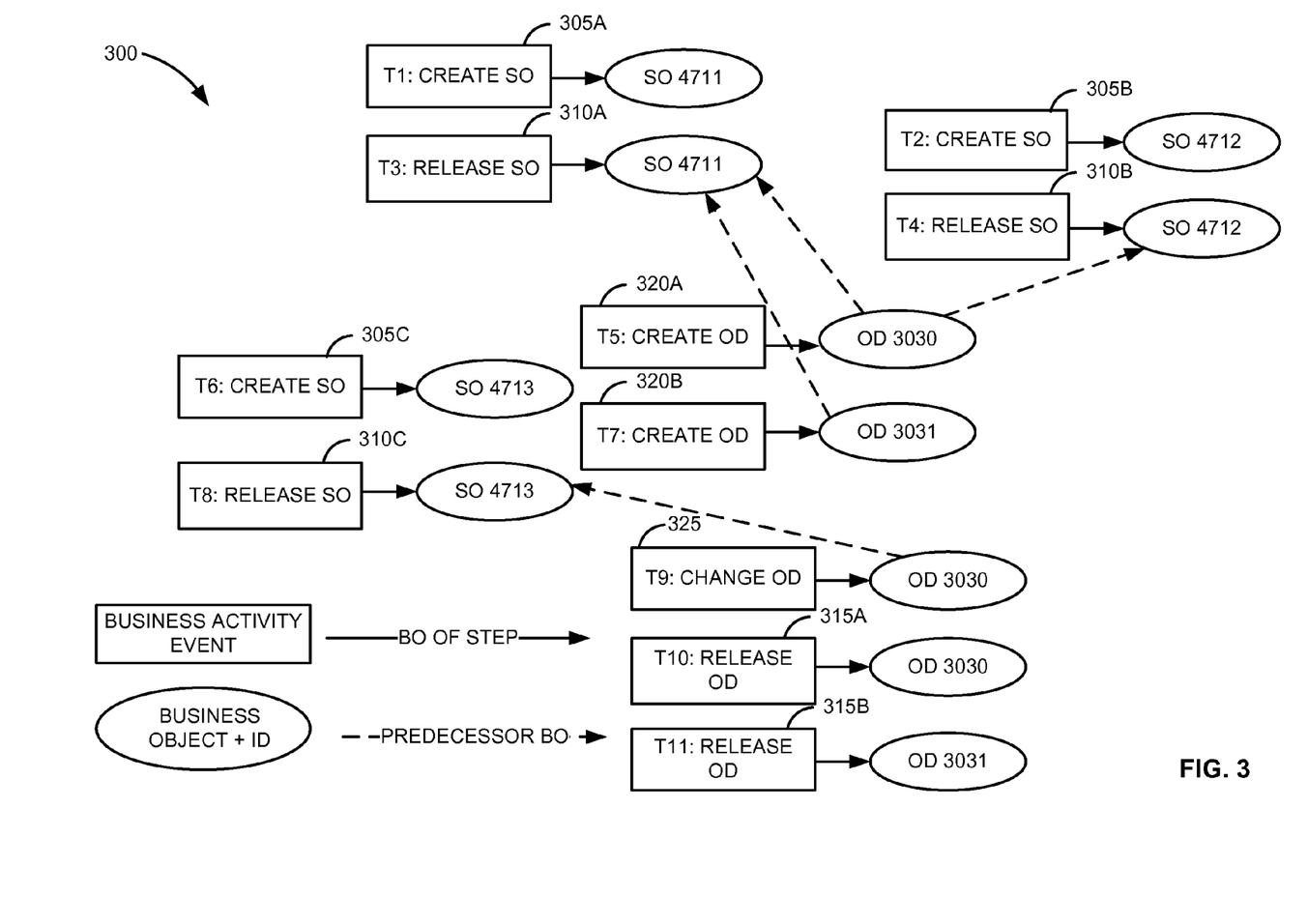
FIG. 3 is a block diagram illustrating an exemplary execution of an order-to-delivery business process, according to an embodiment.

FIG. 3 is a schematic diagram 300 illustrating an exemplary execution of an order-to-delivery business process, according to an embodiment. The exemplary order-to-delivery business process includes publication of multiple business activity events such as creating three sales orders (e.g., create sales orders (SO) 305A to 305C), which are released (e.g., release sales orders (SO) 310A to 310C), and lead to two outbound deliveries (e.g., release outbound deliveries (OD) 315A and 315B). Further, other business activity events include creating outbound deliveries for the released sales orders (e.g., create outbound deliveries (OD) 320A and 320B) and changing outbound delivery (e.g., change outbound delivery (OD) 325). In one exemplary embodiment, T1 to T11 indicates time stamps of the execution of the business activity events in a system.

In one embodiment, a business activity event manager receives the business activity events. Further, business process binding information associated with the business activity events is retrieved. The business process binding information includes a business process definition and a business process step definition associated with the business activity events. Table 2 illustrates business process binding information associated with the business activity events.

TABLE 2

| Timestamp | Business Activity Event | Business Process Definition | Business Process Step Definition | Business Process Start |
| --- | --- | --- | --- | --- |
| T1, T2, T6 | Create sales order | Order-to-delivery | Creating sales order | x |
| T3, T4, T8 | Release sales order | Order-to-delivery | Releasing sales order | — |
| T5, T7 | Create outbound delivery | Order-to-delivery | Creating outbound delivery | — |
| T9 | Change outbound delivery | Order-to-delivery | Changing outbound delivery | — |
| T10, T11 | Release outbound delivery | Order-to-delivery | Releasing outbound delivery | — |

The business activity events occurring at timestamp T1, T2 and T6 indicate a start of business process instances. In one embodiment, a relationship of the business activity events with a business process using the business process binding information is determined. Based on the determination, a business activity log is created in a business process log manager. In one embodiment, each business activity event is linked to the predecessor business activity using the same and predecessor business object information. Further, a business activity can be linked to one or more business activities. Each step marked as business process start creates a new business process instance ID. For the example given above, three business process instances are created.

For the above mentioned example, at T1, the business activity event 'create sales order' 4711 is executed. Therefore, a business process log manager is triggered to log business activity entry for 'create sales order' with ID 1 in the business activity log. Business process step definition ID is identified to determine the number of business process steps associated with the 'create sales order' and corresponding business process definition is assigned to the 'create sales order'. Further, a check is made to determine whether predecessor business object ID is specified and whether there is already a business activity event logged for the business object 'sales order' 4711. There is no predecessor business object for 'sales order' 4711 and there is no business activity event logged. The business activity 'create sales order' is correlated with a business object type and ID and a business process definition ID of the order-to-delivery business process. Further, since business process start is specified, a new process instance with ID 1 is created and business activity ID 1 is connected with the business activity 'create sales order', and the same is logged in the business activity log.

At T9, the business activity event 'change outbound delivery' 3030 is executed. Therefore, a business process log manager is triggered to log business activity entry for the 'change outbound delivery' with ID 9 in the business activity log. Business process step definition ID is identified to determine the number of business process steps associated with the 'change outbound delivery' and corresponding business process definition is assigned to the 'outbound delivery'. Further, a check is made to determine whether predecessor business object type and ID is specified. Since the predecessor business object type and ID is specified with predecessor business object 'sales order' 4713, the 'outbound delivery' is correlated with the type and ID for the predecessor business object 'sales order' 4713. Furthermore, a check is made to determine whether there is already a business activity event logged for 'outbound delivery' 3030 for the business process definition 'order-to-delivery'. A business activity ID 5 for 'create outbound delivery' 3030 is detected, so the 'outbound delivery' 3030 is correlated with the business activity ID 5.

Further, since a business process start is not specified, the existing business process instance IDs for predecessor business activities are determined and the same is correlated with the 'outbound delivery' 3030. The business process instances for the business activity ID 5 is 1 and 2. Business activity ID 8 includes business process instance ID 3. Further, predecessor business object type and ID of 'outbound delivery' for the business process ID 1 ('outbound delivery' 3030 for 2, and 'sales order' 4713) is determined. Then, former business activity ID is correlated with latest time stamp (i.e., business process instance ID 1 is linked with business activity ID 5; business process instance ID 2 is linked with business activity ID 5; and business process instance ID 3 is linked with business activity ID 8). A relationship to this former business activity and the business process instance ID is created and link between the business activity ID and the business process instance ID is determined to log in the business activity log. The business activity log is illustrated in FIG. 5.

Figure 4:
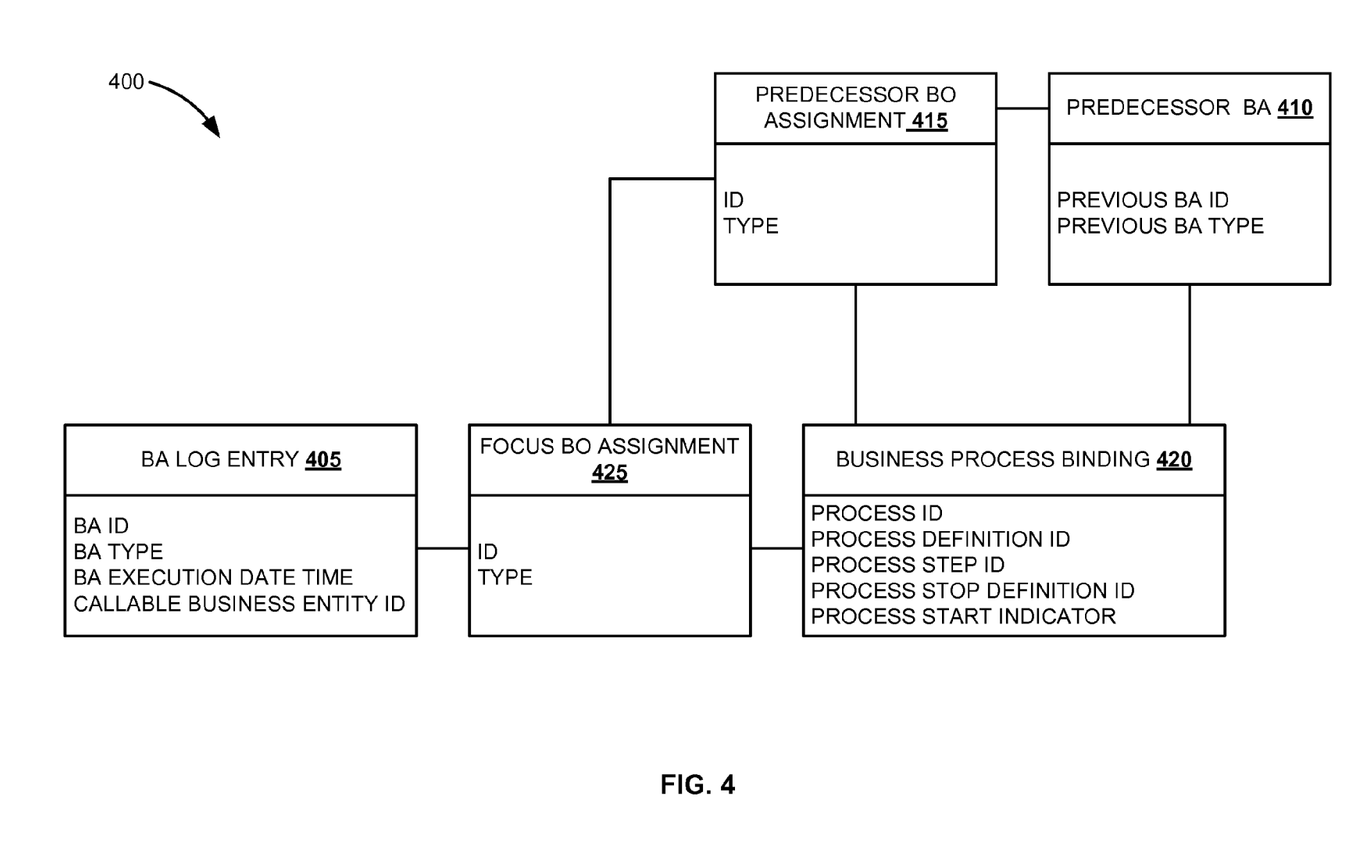
FIG. 4 is block diagram illustrating an exemplary data model of a business activity log, according to an embodiment.

FIG. 4 is an exemplary data model 400 of a business activity log, according to an embodiment. In one embodiment, entries in a business activity (BA) log 405 corresponding to a business activity event depend on details of at least one of a predecessor BA 410, a predecessor business object (BO) assignment 415 and a business process binding 420. The predecessor BA 410 includes at least one of a predecessor BA ID, and a predecessor BA type. The predecessor BO assignment 415 includes details focused for predecessor BO, for example, an ID and a type of the predecessor BO. The business process binding 420 includes details of at least one of a business process instance ID, a business process definition ID, a business process step ID, a business step definition ID, and a business process start indicator, if applicable.

In operation, the predecessor BA 410, the predecessor BO assignment 415 and the business process binding 420 share their corresponding data to create the BA log entry 405. Further, with the received details from the predecessor BA 410, the predecessor BO assignment 415 and the business process binding 420, the BA log entry 405 is created based on focus BO assignment 425. The exemplary business activity log is shown in FIG. 5.

FIG. 5 shows an exemplary business activity log for an exemplary execution of the order-to-delivery business process of FIG. 3, according to an embodiment. The business activity log 500 contains information on the executed business activity (BA) and also the association of the executed BA with a business process. The information includes at least one of a time stamp 505 at which the execution of the BA is completed, a BA type 510, a BA ID 515, a business object (BO) type 520, a BO ID 525, a callable business entity 530 (like the transaction code of the application), a predecessor BO type 535, a predecessor BO ID 540, a predecessor BA type 545, a predecessor BA ID 550, a business process definition ID 555, a business process step definition ID 560, a start process indicator 565, and a business process instance ID 570. In one exemplary embodiment, the business activity log 500 is the main data source for business process monitoring and analytics. The business activity log 500 is accessed to monitor and analyze the business process instance at real time or if required via consumers like the business process monitor and the business process analyzer.

In one exemplary embodiment, the business process monitoring allows the real-time observation of business process instances. The business process analytics allows the ex-post analysis of business processes using statistical and quantitative methods with the focus on providing information on business process performance. Business process analytics may use process metrics, such as process Key Performance Indicators (KPI) to visualize process performance. A business process KPI is assigned to a business process definition and defines a key figure related to the execution of the business process, like number of business process steps of a specific kind performed, lead time between different business process steps, business process status and the like.

In one embodiment, the business activity log provides a process centric and a business object centric view on the logged data. In other words, information in the business activity log is retrieved from a perspective of a business object (i.e., all information related to sales order 4812) and also from a business process (e.g., all information related to order-to-delivery processes).

Figure 6:
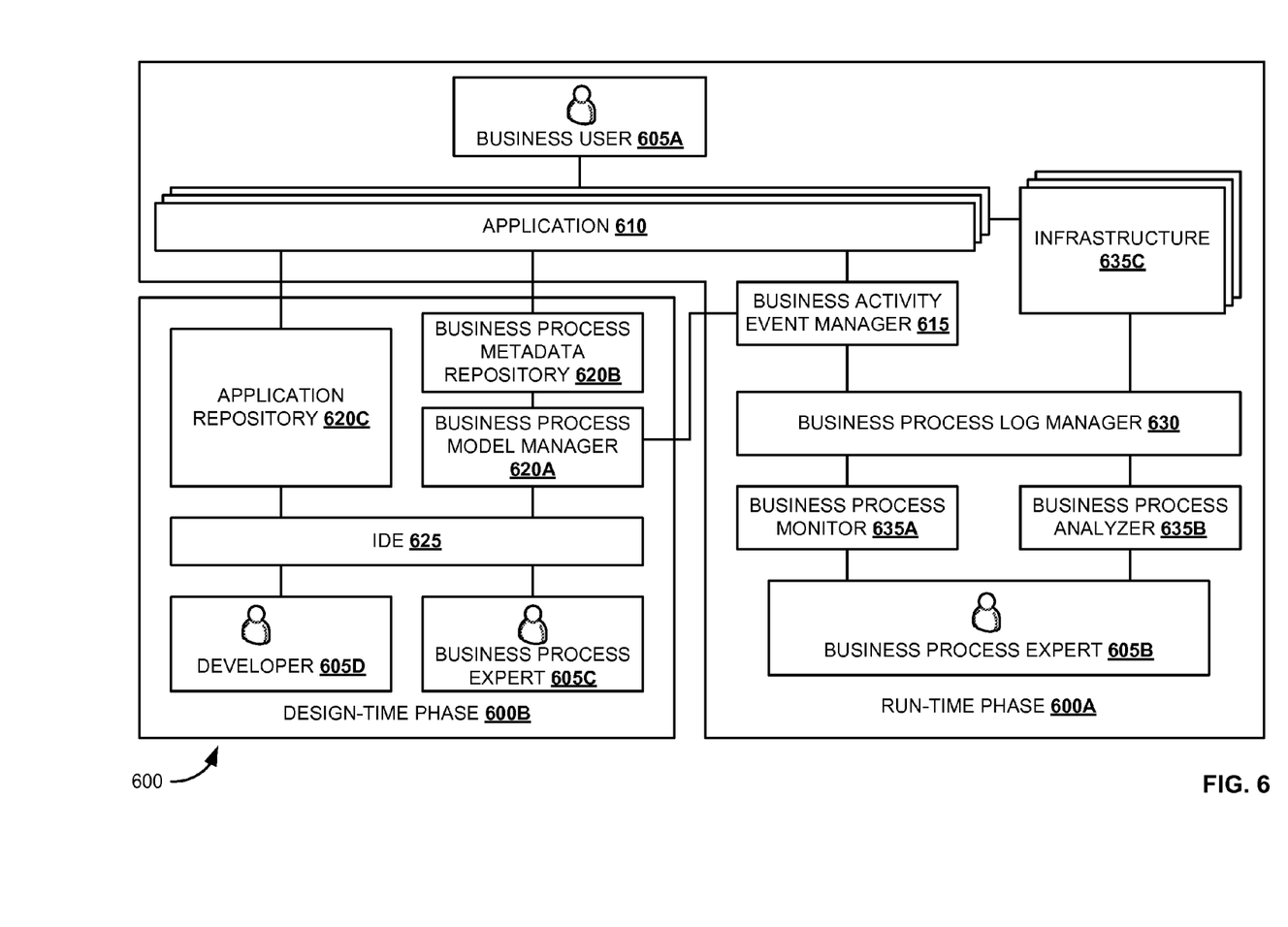
FIG. 6 is a block diagram illustrating the architecture for business process visibility at real time, according to an embodiment.

FIG. 6 is a system diagram 600 illustrating architecture for business process visibility at real time, according to an embodiment. The system 600 includes two communicatively coupled phases, a run-time phase 600A and a design-time phase 600B. In one embodiment, the run-time phase 600A includes an application 610, a business event manger 615, a business process log manager 630, a business process monitor 635A, a business process analyzer 635B, and an infrastructure or engine 635C, which are coupled as shown in 600A. The design-time phase 600B includes a business process model manager 620A, a business process metadata repository 620B, an application repository 620C and an integrated development environment (IDE) 625, which are coupled as shown in 600B.

In operation, during run-time phase 600A, the application 610 publishes one or more business activity events of a business application executed by a business user 605A. The business activity event manager 615 receives the business activity events. In one exemplary embodiment, the business activity event manager 615 includes a business activity observer to receive the business activity events. In one embodiment, the business activity event manager 615 may run in the same logical unit of work (LUW) as the business application and binds the observed business activities to a business process context. In other words, when the business activity event is raised by the application 610, the business activity event manager 615 is executed in the same context as the application 610 raising the business activity event. The business activity event manager 615 is thus able to access data from the context of the application 610. If the business activity event manager is executed in a separate session, it has to read the process context from the database which is also possible but decreasing performance. The business activity event manager 615 observers or receives the business activity events that are completely executed and completed within the application.

Further, the business activity event manager 615 retrieves business process binding information associated with the business activity events from the business process model manager 620A. The business process model manager 620A includes one or more underlying business process definitions. The business process definition includes business process metadata repository 620B and the application repository 620C. The application repository 620C is coupled to the business process model manager 620A through the IDE 625. The IDE includes a development tool and a business process definition tool as accessed by a developer 605D and a business process expert 605C.

In one exemplary embodiment, the application repository 620C includes a callable entity, which is the entity to invoke specific business functionality (for human users with UI and for system/automated execution without UI). The current application classes of callable entities include user interface (UI) transactions, different types of services such as enterprise services, and the like. Conceptually, the callable entity is made up of a number of business activities. Business activities represent the channel independent software artifacts, to execute Business logic. Callable entities are channel-dependent (like designed for standard UI access via a desktop, designed for mobile devices, or designed for system automation) executing business activities. Further, each business activity is able to raise a business activity event by the business logic.

In one exemplary embodiment, the business process metadata repository 620B includes business process definitions and business process façade definition. The business process definitions include process determination rules, a specific type of business rules, associated with the business process step binding. At run-time, the rule is evaluated based on the content of the business activity event. The business activity event identifies the executable business entity. A single business activity event may be bound to more than one business process and step definition. For example, the business activity to create a purchase request, which can be part of the processes for 'self-service procurement' and 'plan-driven procurement'. The process determination rules of both processes evaluate the value of the purchaser group which is part of the business activity event that a purchase request has been created. In case of the business process type 'self-service procurement' the code for the purchase group would be employee and for all other codes of the purchaser group it would be the business process of the type 'plan-driven procurement'.

Further in operation, a relationship between the business activity events and a business process definition is determined at the business activity event manager 615 based on the business process binding information as described in FIG. 3. Further, the business process log manager 630 is triggered by the business activity event manager 615 for logging a business activity log of a business process instance based on the determination. In one exemplary embodiment, the business process log manager 630 includes a business process log provider to access an existing business activity log. Furthermore, the business activity log is accessed to monitor and analyze the business process instance at real time using the business process monitor 635A and the business process analyzer 635B upon receiving a request from a business process expert 605B.

Furthermore, in one exemplary embodiment, the infrastructure or engine 635C is communicatively coupled to the business activity event manager 615 to facilitate inputting the business activity events to other infrastructure. For example, when an execution of a business process is completed, an associated business activity event is inputted to a workflow engine such as NetWeaver® Business Process Management (BPM) engine of SAP®, where a workflow is started, or to Process Integration (PI) system of SAP®, where it is forwarded as a message to other system.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 7:
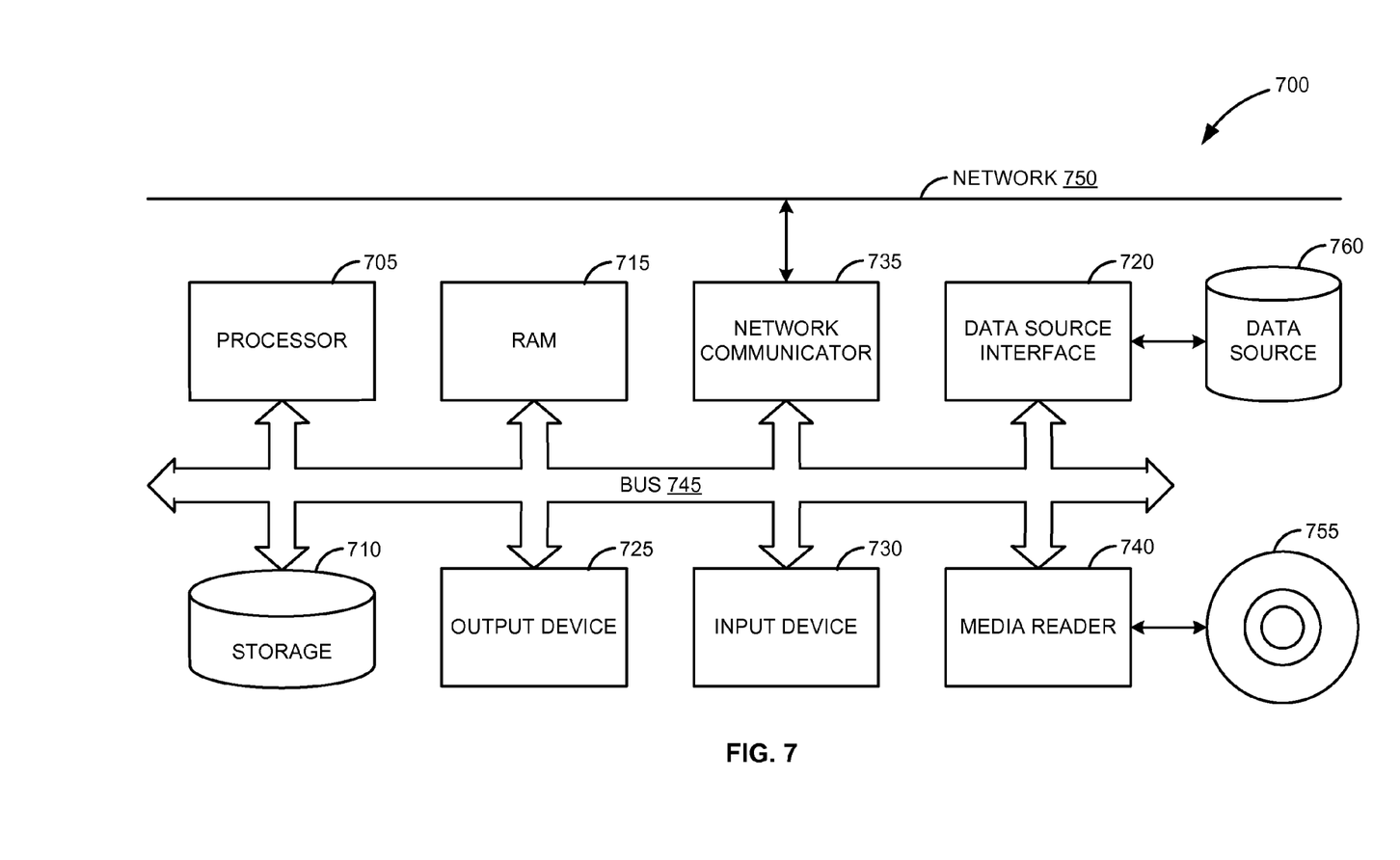
FIG. 7 is a block diagram illustrating a computing environment in which the techniques described for providing business process visibility at real time, according to an embodiment.

FIG. 7 is a block diagram of an exemplary computer system 700. The computer system 700 includes a processor 705 that executes software instructions or code stored on a computer readable storage medium 755 to perform the above-illustrated methods of the invention. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to physically store instructions, which when executed by a computer, cause the computer to:
    receive one or more business activity events from an application;
    retrieve business process binding information associated with the one or more business activity events from a business process model manager;
    identify a relationship between the one or more business activity events and a business process definition based on the business process binding information to determine a business process instance, wherein the relationship is identified by:
        determining a number of business process steps associated with the one or more business activity events to assign corresponding business process definition to the one or more business activity events;
        when a predecessor business object type, and a predecessor business object ID of the one or more business activity events is specified, correlate the one or more business activity events with already logged business activities of the predecessor business object type, the predecessor business object ID and an associated business process definition; and
        when the predecessor business object type and the predecessor business object ID of the one or more business activity events is not specified, correlate the one or more business activity events with already logged business activities of a business object type and a business object ID of the one or more business activity events;
    generate a trigger to log a business activity log of the determined business process instance; and
    monitoring and analyzing the business process instance by accessing the business activity log.

2. The article of manufacture of claim 1, wherein the one or more business activity events comprises a header including at least one of a business activity type, a business activity ID, a business object type, a business object ID, a business activity event time stamp, a predecessor business object type, and a predecessor business object ID.

3. The article of manufacture of claim 1, wherein the business process binding information comprises a business process definition including at least one of business process steps and a business process start indicator, associated with the one or more business activity events.

4. The article of manufacture of claim 1, wherein the relationship between the one or more business activity events and the business process definition is identified by filtering relevant predetermined business activity events from the received one or more business activity events.

5. The article of manufacture of claim 1, wherein identifying the relationship between the one or more business activity events and the business process instance definition further comprises:
    when a business activity ID and a business process start indicator of the one or more business activity events are specified, and when the predecessor business object type and the predecessor business object ID are not specified, creating a new business process instance ID associated with the business activity ID of the one or more business activity event; and
    when the business activity ID and the business process start indicator of the one or more business activity events are not specified, determining a predecessor business process instance ID, and correlating the predecessor business process instance ID and the business activity ID of the one or more business activity event.

6. A computer implemented method to provide business process visibility at real time, the method comprising:
receiving one or more business activity events from an application;
retrieving business process binding information associated with the one or more business activity events from a business process model manager;
the computer, identifying a relationship between the one or more business activity events and a business process definition based on the business process binding information to determine a business process instance, wherein the relationship is identified by:
determining a number of business process steps associated with the one or more business activity events to assign corresponding business process definition to the one or more business activity events;
when a predecessor business object type and a predecessor business object ID of the one or more business activity events is specified, correlating correlate the one or more business activity events with already logged business activities of the predecessor business object type, the predecessor business object ID and an associated business process definition; and
when the predecessor business object type and the predecessor business object ID of the one or more business activity events is not specified, correlating the one or more business activity events with the already logged business activities of a business object type and a business object ID of the one or more business activity events;
the computer, generating a trigger to log a business activity log of the determined business process instance; and
monitoring and analyzing the business process instance by accessing the business activity log.

7. The computer implemented method of claim 6, wherein the one or more business activity events comprises a header including at least one of a business activity type, a business activity ID, a business object ID, a business activity event time stamp, a predecessor business object type and a predecessor business object ID.

8. The computer implemented method of claim 6, wherein the business process binding information comprises a business process definition including at least one of business process steps and a business process start indicator if applicable, associated with the one or more business activity events.

9. The computer implemented method of claim 6, wherein the relationship between the one or more business activity events and the business process definition is identified by filtering relevant predetermined business activity events from the received one or more business activity events.

10. The computer implemented method of claim 6, wherein identifying the relationship between the one or more business activity events and the business process instance definition further comprises:
when a business activity ID and a business process start indicator of the one or more business activity events are specified, and when the predecessor business object type and the predecessor business object ID are not specified, creating a new business process instance ID associated with the business activity ID of the one or more business activity event; and
when the business activity ID and the business process start indicator of the one or more business activity events are not specified, determining a predecessor business process instance ID, and correlating the predecessor business process instance ID and the business activity ID of the one or more business activity event.

11. A computer system for providing business process visibility at real time, the system comprising:
a memory to store program code;
a processor coupled to the memory for executing the program code; and
the program code comprising
a business activity event manager, wherein the business activity event manager is operable to:
receive one or more business activity events generated by an application;
retrieve business process binding information associated with the one or more business activity events;
identify a relationship between the one or more business activity events and a business process definition based on the business process binding information to determine a business process instance, wherein the relationship is identified by:
determining a number of business process steps associated with the one or more business activity events to assign corresponding business process definition to the one or more business activity events;
when a predecessor business object type and a predecessor business object ID of the one or more business activity events is specified, correlate the one or more business activity events already logged business activities of with the predecessor business object type, the predecessor business object ID and an associated business process definition; and
when the predecessor business object type and the predecessor business object ID of the one or more business activity event is not specified, correlate the one or more business activity events with the already logged business activities of a business object type and a business object ID of the one or more business activity events; and
trigger a business process log manager for logging a business activity log of the determined business process instance; and
the business log manager coupled to the business activity event manager for logging a business activity log based on the determination;
a business process monitor for monitoring the business process instance; and
a business process analyzer for analyzing the business process instance.

12. The computer system of claim 11, wherein the business activity event manager is coupled to a business process model manager to retrieve the business process binding information.

13. The computer system of claim 12, wherein the business process model manager comprises one or more underlying process definitions including a business process metadata repository to store the business process binding information and a business application repository.

14. The computer system of claim 11, further comprising a business process monitor and a business process analyzer coupled to the business activity event manager for accessing the business activity log to monitor and analyze the business process instance at real time.

15. The computer system of claim 11, wherein the one or more business activity events comprises a header including at least one of a business activity type, a business activity ID, a business object type a business object ID, a business activity event time stamp, a predecessor business object type and a predecessor business object ID; and the business process binding information comprises a business process definition including at least one of business process steps and a business process start indicator, associated with the one or more business activity events.

16. The computer system of claim 11, wherein the business activity event manager filters relevant predetermined business activity events from the received one or more business activity events for identifying the relationship between the one or more business activity events and the business process definition.

17. The computer system of claim 11, wherein identifying the relationship between the one or more business activity events and the business process instance definition further comprises:
   when a business activity ID and a business process start indicator of the one or more business activity events are specified, and when the predecessor business object type and the predecessor business object ID are not specified, creating a new business process instance ID associated with the business activity ID of the one or more business activity event; and
   when the business activity ID and the business process start indicator of the one or more business activity events are not specified, determining a predecessor business process instance ID, and correlating the predecessor business process instance ID and the business activity ID of the one or more business activity event.

* * * * *